(12) United States Patent
Tseng

(10) Patent No.: US 8,060,122 B2
(45) Date of Patent: Nov. 15, 2011

(54) METHOD AND APPARATUS FOR MANAGING DOWNLINK DISCONTINUOUS RECEPTION OPERATION IN A WIRELESS COMMUNICATIONS SYSTEM

(75) Inventor: Li-Chih Tseng, Taipei (TW)

(73) Assignee: Innovative Sonic Limited, Port Louis (MU)

( * ) Notice: Subject to any disclaimer, the term of this patent is extended or adjusted under 35 U.S.C. 154(b) by 704 days.

(21) Appl. No.: 12/125,047

(22) Filed: May 21, 2008

(65) Prior Publication Data

US 2008/0299996 A1 Dec. 4, 2008

Related U.S. Application Data

(60) Provisional application No. 60/940,688, filed on May 29, 2007.

(51) Int. Cl.
*H04W 68/00* (2009.01)
(52) U.S. Cl. .......................................... 455/458
(58) Field of Classification Search .................. 455/458
See application file for complete search history.

(56) References Cited

FOREIGN PATENT DOCUMENTS
EP 1 819 182 A1 8/2007

OTHER PUBLICATIONS

3GPP TS 25.331 V7.4.0 (Mar. 2007), Technical Specification Group Radio Access Network: Radio Resource Control (RRC), (Release7), P1,74-81,471-472,559,565.

TTAT.3G-25.331(R4-4.17.0), "IMT-2000 3GPP-Radio resource control (RRC) protocal specification (R4))," Apr. 19, 2006, p. 1-p. 929.

Mobile Network and Applications (2007) 12:5-14, DOI 10.1007/s11036-006-0002-0, Title: "Dynamic Power Saving Mechanism for 3G UMTS System," Shun-Ren Yang, Feb. 2007, p. 5-p. 14.

"Universal Mobile Telecommunications System(UMTS); Radio Resourse Control (RRC); Protocol specification (3GPP TS 25.331 version 7.4.0 Release 7); ETSI TS 125 331", Mar. 1, 2007, p. 80 line 10~p. 81 line 11, XP014037920, ISSN: 0000-0001, ETSI Standards, Lis, Sophia Antipolis Cedex, France.

"Universal Mobile Telecommunications System (UMTS); Radio Resource Control (RRC); Protocol specification (3GPP TS 25.331 version 7.6.0 Release 7)", 3RD Generation Partnership Project (3GPP); Technical Specification (TS), ETSI TS 125 331 V7.6.0, Oct. 1, 2007, p. 1-19, p. 81-94 & p. 613-614, XP002483173.

3GPP, R2-072262 3GPP TSG-RAN WG2 Meeting #58, "Introduction two DRX schemes in URA_PCH and CELL_PCH", May 2007.

*Primary Examiner* — William D Cumming
(74) *Attorney, Agent, or Firm* — Klein, O'Neill & Singh, LLP

(57) ABSTRACT

A method for managing downlink discontinuous reception associated with paging for a user equipment of a wireless communications system is provided in order to avoid system malfunction due to inappropriate use of configuration. The method includes initiating a radio resource control, hereinafter called RRC, connection establishment procedure to request a network terminal for an RRC connection, receiving a request accepting message including a first information element for indicating the UE an assigned RRC state to be entered and a second information element for providing configuration corresponding to the downlink discontinuous reception, and ignoring the second information element when the assigned RRC state is a state for allocation of dedicated radio resources.

10 Claims, 7 Drawing Sheets

METHOD AND APPARATUS FOR MANAGING DOWNLINK DISCONTINUOUS RECEPTION OPERATION IN A WIRELESS COMMUNICATIONS SYSTEM

CROSS REFERENCE TO RELATED APPLICATIONS

This application claims the benefit of U.S. Provisional Application No. 60/940,688, filed on May 29, 2007 and entitled "Method And Apparatus for Reordering Packet and Handling RRC Reconfiguration", the contents of which are incorporated herein by reference.

BACKGROUND OF THE INVENTION

1. Field of the Invention

The present invention relates to a method of managing downlink discontinuous reception for a wireless communications system and related communications device, and more particularly to a method of managing downlink discontinuous reception corresponding to a radio resource control procedure for a user equipment of a wireless communications system and related communications device.

2. Description of the Prior Art

The third generation (3G) mobile telecommunications system, the Universal Mobile Telecommunications System (UMTS), has adopted a Wideband Code Division Multiple Access (WCDMA) wireless air interface access method for a cellular network. WCDMA provides high frequency spectrum utilization, universal coverage, and high quality, high-speed multimedia data transmission. The WCDMA method also meets all kinds of quality of service (QoS) requirements simultaneously, providing diverse, flexible, two-way transmission services and better communication quality to reduce transmission interruption rates. Through the 3G mobile telecommunications system, a user can utilize a wireless communications device, such as a mobile phone, to realize real-time video communications, conference calls, real-time games, online music broadcasts, and email sending/receiving. However, these functions rely on fast, instantaneous transmission. Thus, targeting the third generation mobile telecommunication technology, the prior art provides High Speed Package Access (HSPA) technology, which includes High Speed Downlink Package Access (HSDPA) and High Speed Uplink Package Access (HSUPA), to increase bandwidth utility rate and package data processing efficiency to improve the uplink/downlink transmission rate.

According to the related protocol specifications of the 3rd Generation Partnership Project (3GPP), the Radio Resource Control (RRC) layer, a Layer 3 protocol, is the core of communications protocols related to AS and is located in radio network controllers (RNC) of the UMTS Terrestrial Radio Access Network (UTRAN) and a user equipment (UE). The RRC layer uses RRC messages formed from many Information Elements (IEs) to perform RRC procedures. The RRC layer defines various RRC states to describe the usage of radio resource for the UE. RRC states can be divided into idle mode and RRC connected mode according to whether the RRC connection is established. RRC connected mode are further divided into a CELL_DCH state, a CELL_FACH state, a CELL_PCH state and a URA_PCH state. The UE in the CELL_DCH state uses dedicated radio resources not shared with other UEs, where the UE in the CELL_PCH or URA_PCH state receives paging or broadcasting information from the UTRAN. No data transmission is allowed in the CELL_PCH and URA_PCH states.

The foregoing specification provides downlink discontinuous reception (DL DRX) operation, allowing the UE in the CELL_PCH or the URA_PCH state to receive paging information based on a discontinuous timing mode without burdensome RRC disconnecting, so as to save UE power. The DL DRX operation includes two kinds of reception modes configured with a DRX cycle length coefficient IE and a DRX cycle length coefficient 2 IE, respectively. A UTRAN DRX cycle length coefficient IE includes both of the two IEs and moreover a Time for DRX cycle 2 IE. The two reception modes are hereinafter called first reception mode and second reception mode, respectively. The second reception mode provides better paging efficiency than the first reception mode.

When the DL DRX operation is in use, the UE employs a timer T319 for switching between the first and the second reception mode. In general, when the UE enters the CELL_PCH or the URA_PCH state, using the second reception mode, the UE activates and sets the timer T319 according to the Time for DRX cycle 2 IE. When the timer T319 expires, the UE switches to use the first reception mode. In other words, when the UTRAN does not page the UE for a period longer than the set time of the timer T319, the UE automatically degrades itself to the lower speed paging operation, namely the first reception mode, so as to reduce power consumption.

On the other hand, the UE in the idle mode initiates an RRC connection establishment procedure when attempting to request the UTRAN for an RRC connection. During the RRC connection establishment procedure, the UE sends an RRC Connection Request message to the UTRAN, and the UTRAN correspondingly responds with an RRC Connection Setup message if accepting the request. Finally, the UE sets related parameters or variables according to configuration of the RRC Connection Setup message and then reports back with an RRC Connection Setup Complete message.

The RRC Connection Setup message includes an RRC State Indicator IE indicating an RRC state for the UE to enter and the abovementioned UTRAN DRX cycle length coefficient IE. The UE activates and sets the timer T319 according to the UTRAN DRX cycle length coefficient IE when the indicated RRC state is the CELL_DCH, the CELL_PCH or the URA_PCH state. In this situation, the UE entering the CELL_PCH or the URA_PCH state successfully receives paging information under the second reception mode. However, the abovementioned DL DRX operation is not designed to be applicable for the UE entering the CELL_DCH state. That is to say, the timer T319 is activated in an inappropriate situation, possibly causing system errors in the UE entering the CELL_DCH state.

SUMMARY OF THE INVENTION

The present invention therefore provides a method of managing downlink discontinuous reception for a UE of a wireless communications system and related communications device that can prevent the UE from mistakenly activating a timer when entering the CELL_DCH state, so as to avoid system errors mentioned in the prior art.

The present invention discloses a method of managing downlink discontinuous reception corresponding to paging operation for a user equipment of a wireless communications system. The method includes initiating an RRC connection establishment procedure to request a network terminal for an RRC connection, from the network terminal receiving a request accepting message including a first information element configured for indicating an RRC state for the user equipment to enter and a second information element configured for providing configuration corresponding to the downlink discontinuous reception, and then ignoring the second information element when the indicated RRC state is an RRC state for allocation of dedicated radio resources.

The present invention further discloses a communications device of a wireless communications system for accurately managing downlink discontinuous reception corresponding to paging operation. The communications device includes a control circuit, a processor and a memory. The control circuit is used for realizing functions of the communications device. The processor is installed in the control circuit and used for executing a program code to command the control circuit. The memory is installed in the control circuit and coupled to the processor, and used for storing the program code. The program code includes initiating an RRC connection establishment procedure to request a network terminal for an RRC connection, from the network terminal receiving a request accepting message including a first information element configured for indicating an RRC state for the communications device to enter and a second information element configured for providing configuration corresponding to the downlink discontinuous reception, and then ignoring the second information element when the indicated RRC state is an RRC state for allocation of dedicated radio resources.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
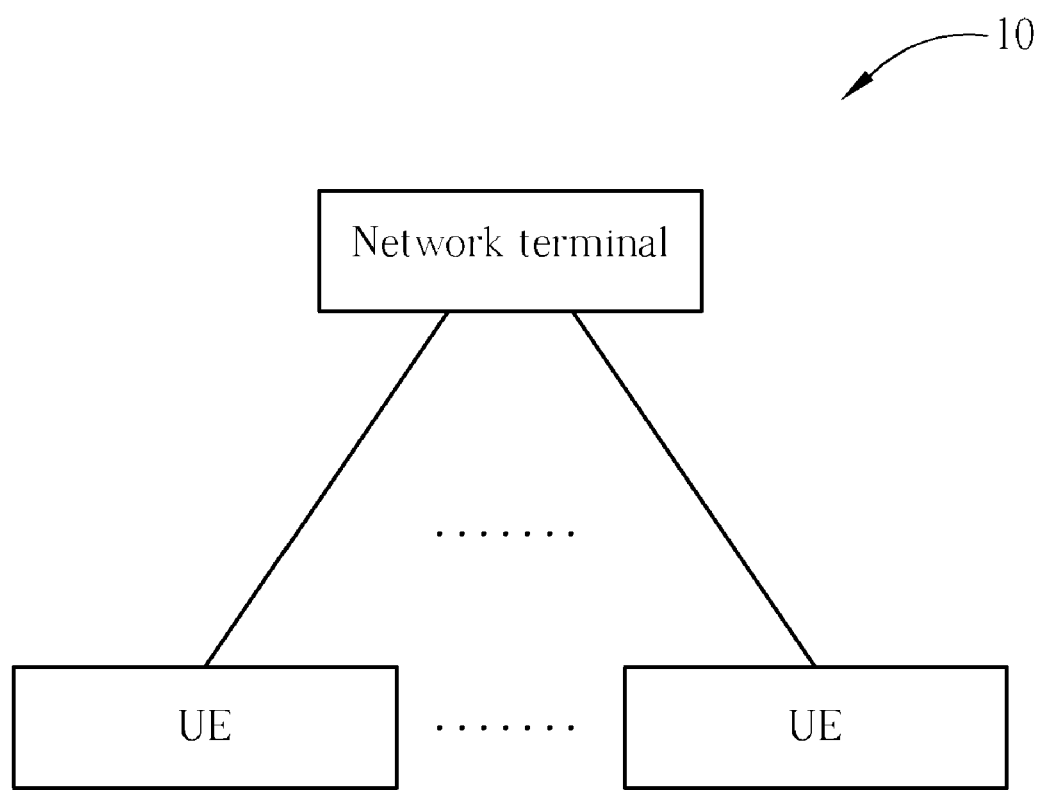
FIG. 1 is a schematic diagram of a wireless communications system.

Please refer to FIG. 1, which is a schematic diagram of a wireless communications system 10. The wireless communications system 10 is preferred to be a High Speed Package Access (HSPA) system of a third generation (3G) mobile communications system, and is briefly formed with a network terminal and a plurality of user equipments. In FIG. 1, the network terminal and the user equipments (UEs) are simply utilized for illustrating the structure of the wireless communications system 10. Practically, the network terminal may include a plurality of base stations, radio network controllers, and so on according to actual demands, and the UEs can be apparatuses such as mobile phones, computer systems, etc.

Figure 2:
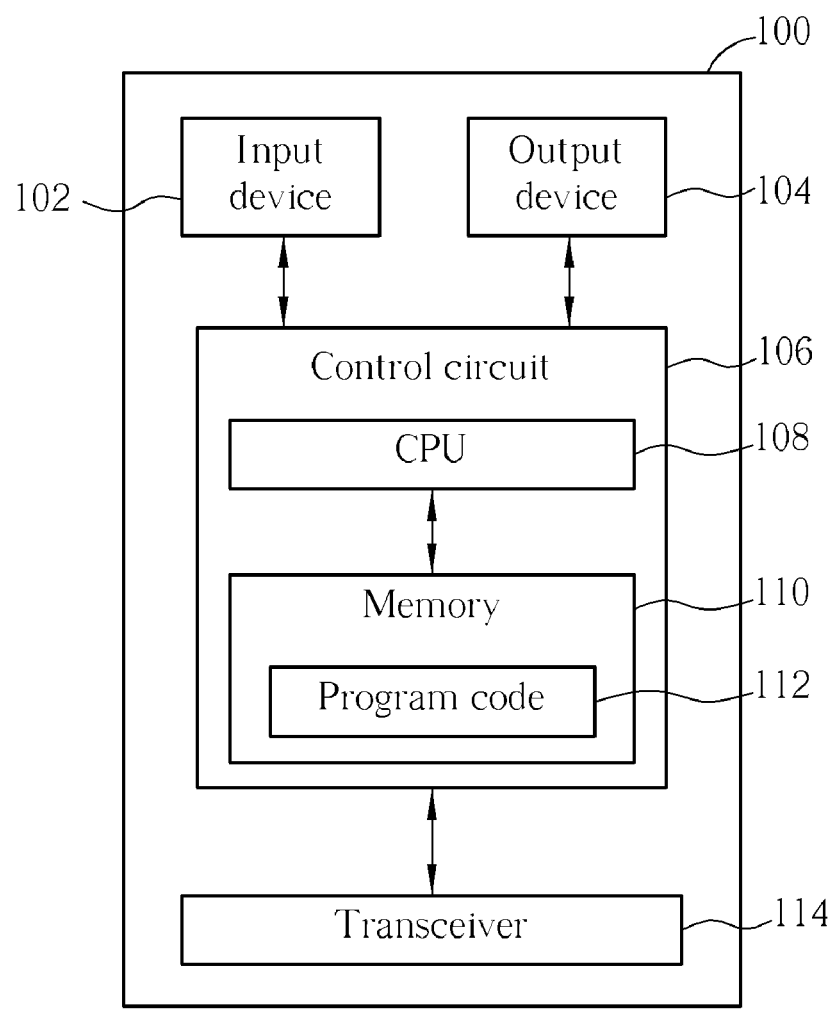
FIG. 2 is a functional block diagram of a communications device.

Please refer to FIG. 2, which is a functional block diagram of a communications device 100. The communications device 100 can be utilized for realizing the UEs in FIG. 1. For the sake of brevity, FIG. 2 only shows an input device 102, an output device 104, a control circuit 106, a central processing unit (CPU) 108, a memory 110, a program code 112, and a transceiver 114 of the communications device 100. In the communications device 100, the control circuit 106 executes the program code 112 in the memory 110 through the CPU 108, thereby controlling an operation of the communications device 100. The communications device 100 can receive signals input by a user through the input device 102, such as a keyboard, and can output images and sounds through the output device 104, such as a monitor or speakers. The transceiver 114 is used to receive and transmit wireless signals, delivering received signals to the control circuit 106, and outputting signals generated by the control circuit 106 wirelessly. From a perspective of a communications protocol framework, the transceiver 114 can be seen as a portion of Layer 1, and the control circuit 106 can be utilized to realize functions of Layer 2 and Layer 3.

Figure 3:
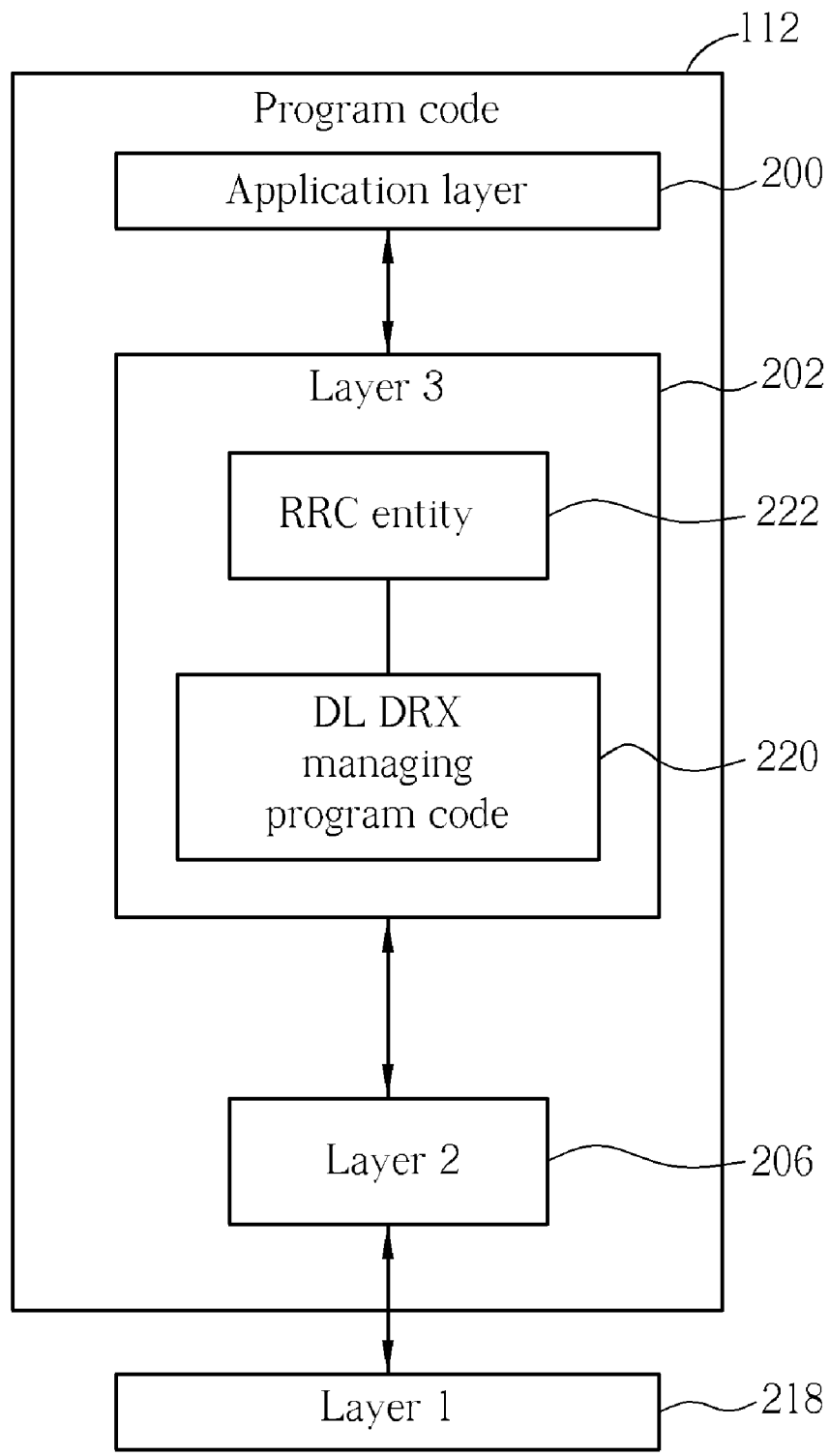
FIG. 3 is a diagram of the program code shown in FIG. 2.

Please continue to refer to FIG. 3. FIG. 3 is a diagram of the program code 112 shown in FIG. 2. The program code 112 includes an application layer 200, a Layer 3 202, and a Layer 2 206, and is coupled to a Layer 1 218. The Layer 3 202 includes a radio resource control (RRC) entity 222 for controlling the Layer 1 218 and the Layer 2 206 with RRC messages and information elements (IEs) and thereby exchanging signaling with the network terminal of the wireless communications system 10 through RRC procedures. Furthermore, the RRC entity 222 can change an RRC state of the communications device 100, switching among an Idle mode, a CELL_PCH, a URA_PCH, a CELL_FACH or a CELL_DCH state.

Figure 4:
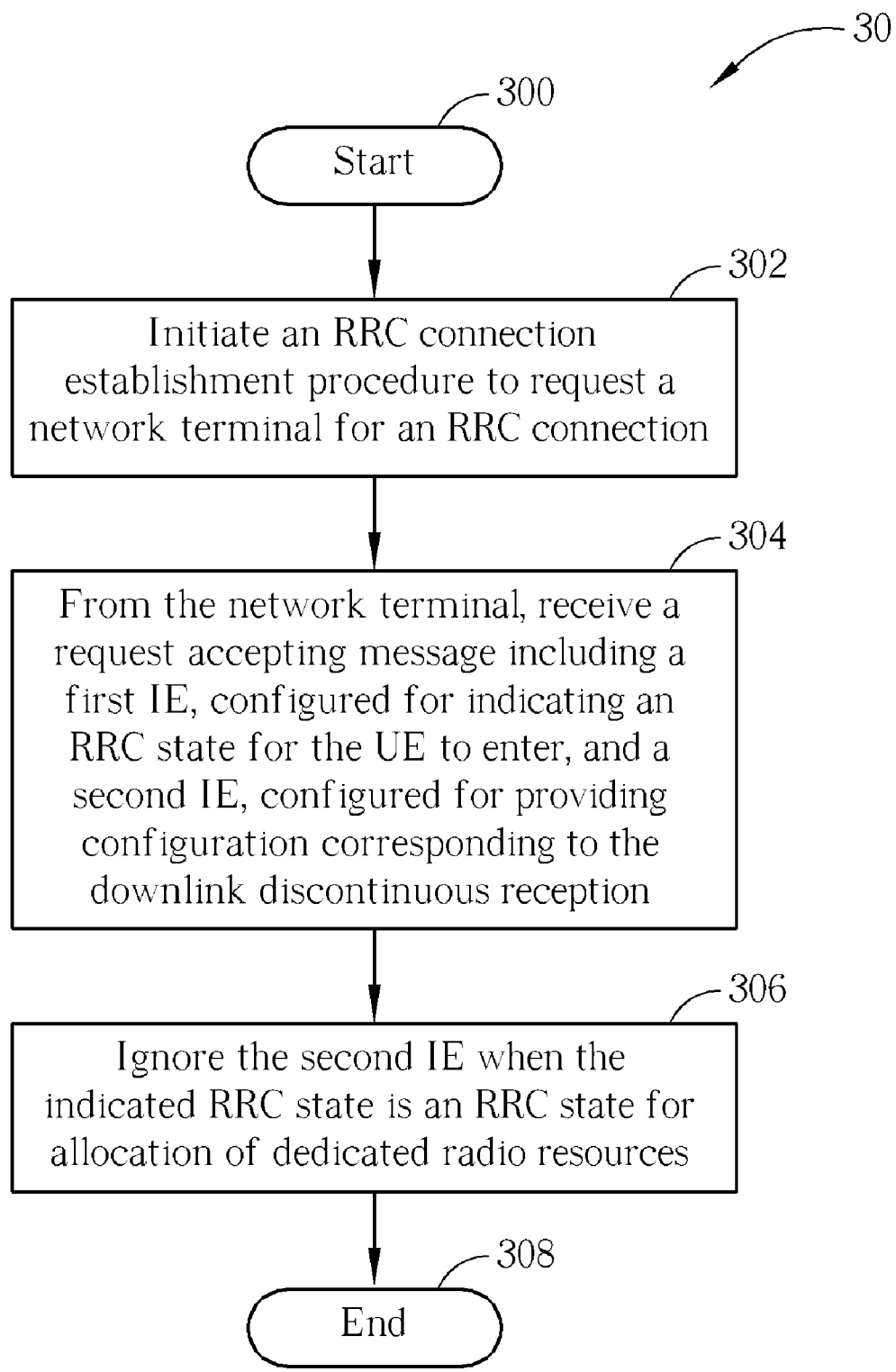
FIG. 4 is a flowchart diagram of a process according to an embodiment of the present invention.

The communications device 100 is equipped with a downlink discontinuous reception (DL DRX) function for the CELL_PCH and URA_PCH states. A timer T319 provided in the downlink discontinuous reception is used for switching a reception mode of the communications device 100 for different receiving cycles. In this situation, the embodiment of the present invention provides DL DRX managing program code 220 for the queuing operation to prevent the UE from mistakenly activating the timer T319 when entering the CELL_DCH state. Please refer to FIG. 4, which illustrates a schematic diagram of a process 30 according to an embodiment of the present invention. The process 30 is utilized to manage downlink discontinuous reception corresponding to paging operation for a UE of the wireless communications system 10, and can be compiled into the DL DRX managing program code 220. The process 30 includes the following steps:

Step 300: Start.

Step 302: Initiate an RRC connection establishment procedure to request a network terminal for an RRC connection.

Step 304: From the network terminal, receive a request accepting message including a first IE, configured for indicating an RRC state for the UE to enter, and a second IE, configured for providing configuration corresponding to the downlink discontinuous reception.

Step 306: Ignore the second IE when the indicated RRC state is an RRC state for allocation of dedicated radio resources.

Step 308: End.

Figure 5:
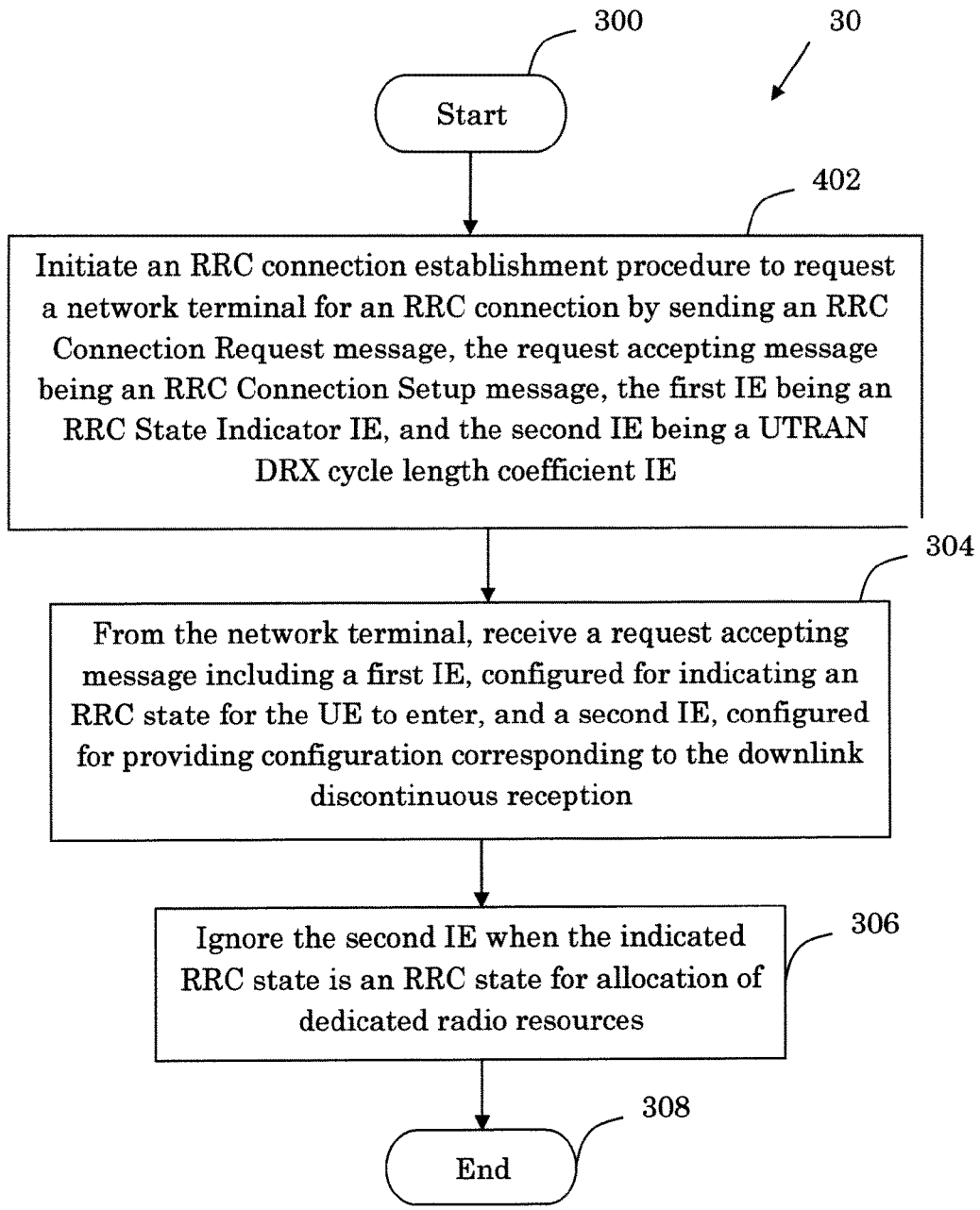
FIG. 5 is a flowchart diagram of a process according to another embodiment of the present invention.
Figure 6:
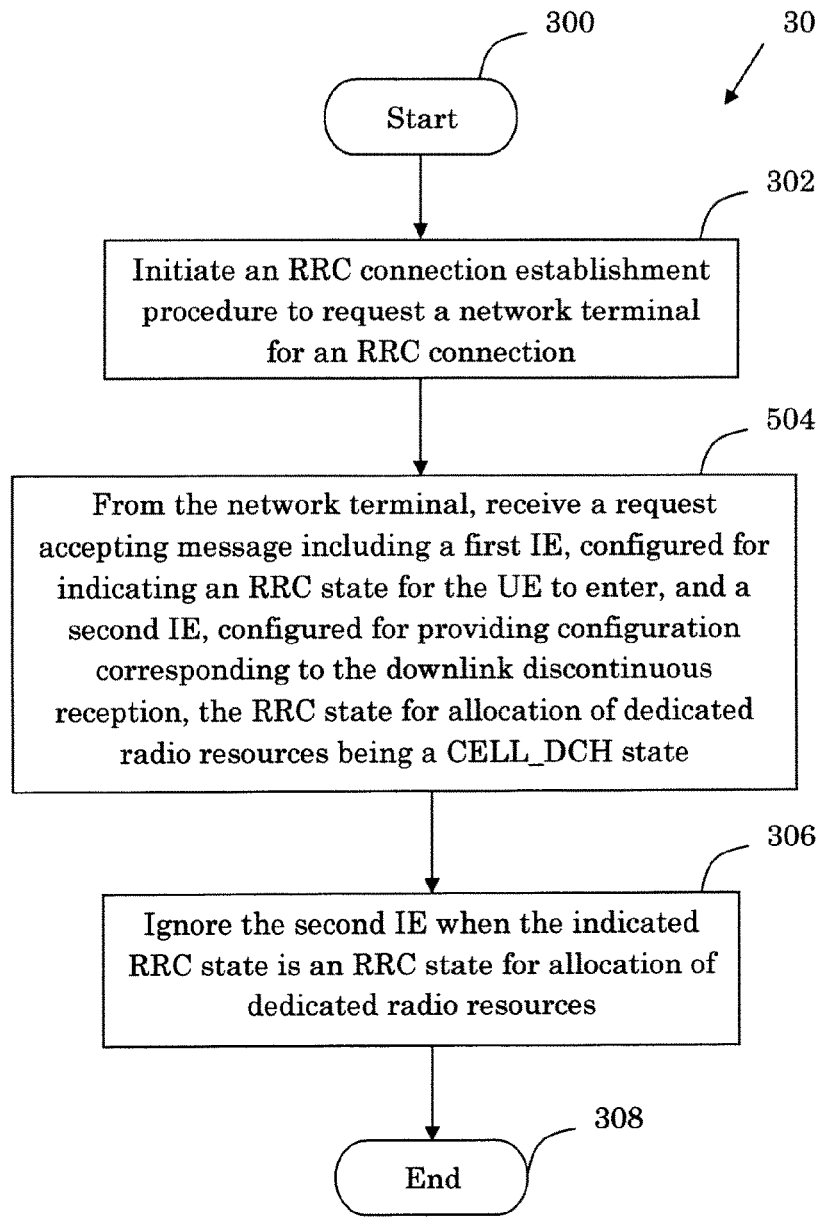
FIG. 6 is a flowchart diagram of a process according to another embodiment of the present invention.
Figure 7:
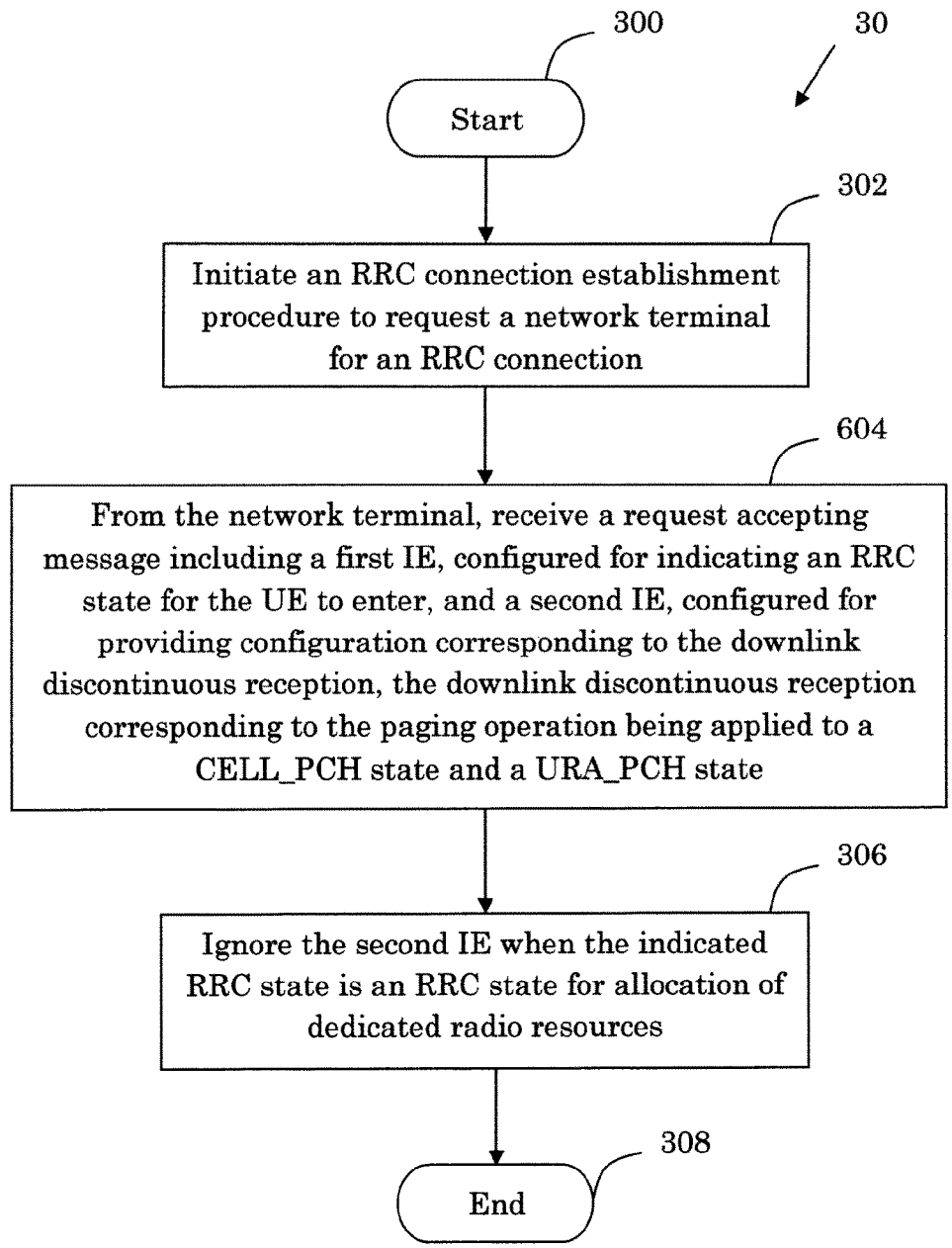
FIG. 7 is a flowchart diagram of a process according to another embodiment of the present invention.

According to the process 30, after the UE initiates the RRC connection establishment procedure, the embodiment of the present invention ignores configuration of the second IE of the request accepting message when the indicated RRC state of the first IE is the RRC state for allocation of dedicated radio resources. Preferably, as shown in FIG. 5 at 402, the request accepting message is an RRC Connection Setup message, the first IE is an RRC State Indicator IE, and the second IE is a UTRAN DRX cycle length coefficient IE. In this situation, as shown in FIG. 5 at 402, the UE in the idle mode first sends an RRC Connection Request message to request the network terminal for an RRC connection when initiating the RRC connection establishment procedure. The network terminal sends the RRC Connection Setup message in response to the RRC Connection Request message, and thereby, from the RRC State Indicator IE, the UE acquires the RRC state that the UE needs to enter after the completion of the RRC connection establishment procedure. As shown in FIG. 6 at 504, when the RRC state indicated in the RRC Connection Setup message is CELL_DCH state, the UE ignores configuration of the UTRAN DRX cycle length coefficient IE also included in the RRC Connection Setup message. As a result, the timer T319 will not be activated by the UE entering the CELL_DCH state after the completion of the RRC connection establishment procedure. Furthermore, as described above, the RRC entity 222 can change an RRC state of the communications device 100, switching among an Idle mode, a CELL_PCH, a URA PCH. Accordingly, as shown in FIG. 7 at 604, when the RRC state indicated in the RRC Connection Setup message is CELL_PCH or a URA_PCH state, the UE ignores configuration of the second IE of the request accepting message when the indicated RRC state of the first IE is the RRC state for allocation of dedicated radio resources.

In conclusion, the UE in the embodiments of the present invention ignore configuration of the IE corresponding to the DL DRX function when the UE is indicated to enter the CELL_DCH state, so that the system errors due to inaccurate activation of related timer or variable can be avoided.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of managing downlink discontinuous reception corresponding to paging operation for a user equipment of a wireless communications system, the method comprising:
    initiating a radio resource control, hereinafter called RRC, connection establishment procedure to request a network terminal for an RRC connection;
    receiving a request accepting message from the network terminal, the request accepting message comprising a first information element, configured for indicating an RRC state for the user equipment to enter, and a second information element, configured for providing configuration corresponding to the downlink discontinuous reception; and
    ignoring the second information element when the indicated RRC state is an RRC state for allocation of dedicated radio resources.

2. The method of claim 1, wherein initiating the RRC connection establishment procedure to request the network terminal for the RRC connection comprises sending an RRC Connection Request message.

3. The method of claim 2, wherein the request accepting message is an RRC Connection Setup message, the first information element is an RRC State Indicator information element, and the second information element is a universal terrestrial radio access network (UTRAN) discontinuous reception (DRX) cycle length coefficient information element.

4. The method of claim 1, wherein the RRC state for allocation of dedicated radio resources is a cell dedicated channel (CELL_DCH) state.

5. The method of claim 1, wherein the downlink discontinuous reception corresponding to the paging operation is applied to a cell paging channel (CELL_PCH) state and a UTRAN registration area paging channel (URA_PCH) state.

6. A communications device of a wireless communications system for accurately managing downlink discontinuous reception corresponding to paging operation, the communications device comprising:
    a control circuit for realizing functions of the communications device;
    a central processing unit coupled to the control circuit for executing a program code to operate the control circuit; and
    a memory coupled to the central processing unit for storing the program code; wherein the program code comprises:
        initiating a radio resource control, hereinafter called RRC, connection establishment procedure to request a network terminal for an RRC connection;
        receiving a request accepting message from the network terminal, the request accepting message comprising a first information element, configured for indicating an RRC state for the communications device to enter, and a second information element, configured for providing configuration corresponding to the downlink discontinuous reception; and
        ignoring the second information element when the indicated RRC state is an RRC state for allocation of dedicated radio resources.

7. The communications device of claim 6, wherein initiating the RRC connection establishment procedure to request the network terminal for the RRC connection comprises sending an RRC Connection Request message.

8. The communications device of claim 7, wherein the request accepting message is an RRC Connection Setup message, the first information element is an RRC State Indicator information element, and the second information element is a universal terrestrial radio access network (UTRAN) discontinuous reception (DRX)cycle length coefficient information element.

9. The communications device of claim 6, wherein the RRC state for allocation of dedicated radio resources is a cell dedicated channel (CELL_DCH) state.

10. The communications device of claim 6, wherein the downlink discontinuous reception corresponding to the paging operation is applied to a cell paging channel (CELL_PCH state and a UTRAN registration area paging channel (URA_PCH) state.

* * * * *